J. H. Mears.
Harvester Rake.
Nº 35653    Patented Jun. 17. 1862.

Sheet 1 2 Sheets

Witnesses.
W. G. Ritch
Samuel P. Savoy

Inventor.
John. H. Mears

Sheet 2 - 2 Sheets
J. H. Mears.
Harvester Rake.
Nº 35653      Patented Jun. 17, 1862.
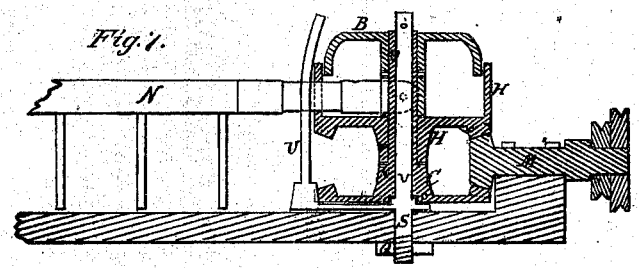
Fig. 1.
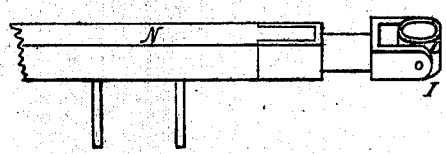
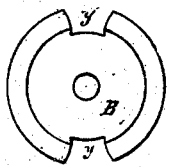
Fig. 3.
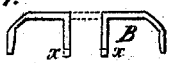
Fig. 4.
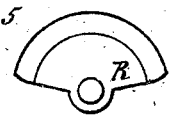
Fig. 5.
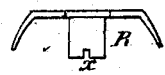
Fig. 6.
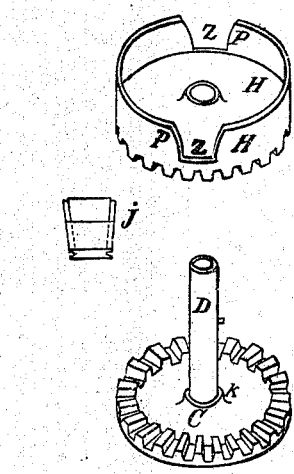
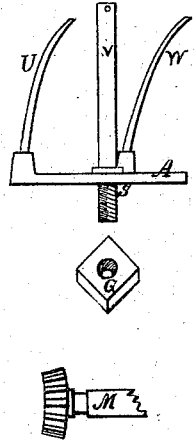
Witnesses.
W. G. Ritch
Samuel P. Gary
Inventor.
John. H. Mears

UNITED STATES PATENT OFFICE.

JOHN H. MEARS, OF OSHKOSH, WISCONSIN, ASSIGNOR TO HIMSELF AND ALFRED WARD, OF SAME PLACE.

IMPROVEMENT IN RAKES FOR HARVESTERS.

Specification forming part of Letters Patent No. 35,653, dated June 17, 1862.

*To all whom it may concern:*

Be it known that I, JOHN H. MEARS, of Oshkosh, in the county of Winnebago and State of Wisconsin, have invented a new and Improved Raking Attachment for Harvesters; and I do hereby declare that the following is a full and exact description of the same, reference being had to the annexed drawings, making a part of this specification, in which—

Figure 2:
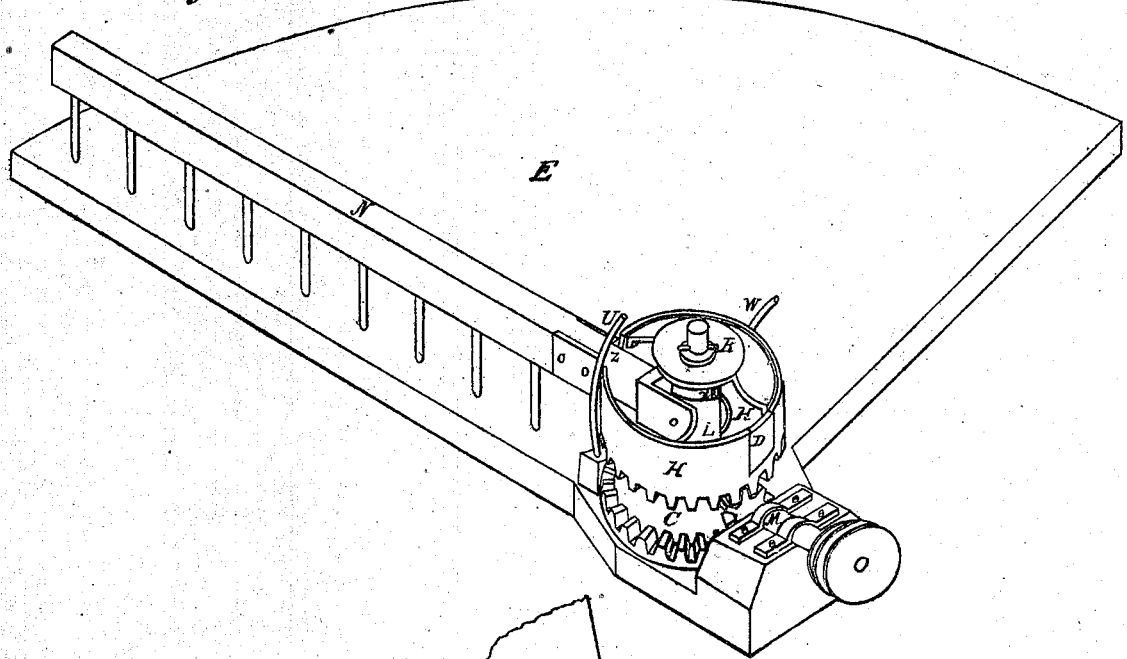
Figure 1:
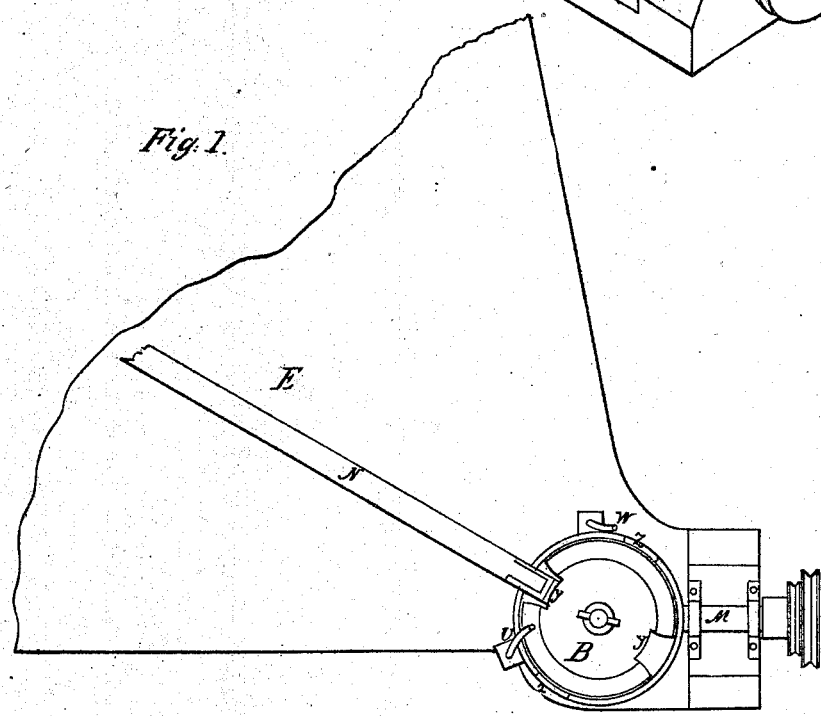

Figure 1 is a plan or top view of my invention, with rake N in an elevated position, mounted with cap B; Fig. 2, a perspective view of the same mounted with fractional cap R; Fig. 3, a plan or top view of saucer-shaped cap B; Fig. 4, a vertical section of the same; Fig. 5, a plan or top view of fractional cap R; Fig. 6, a vertical section of the same; Fig. 7, a vertical section of my invention.

Similar letters of reference indicate corresponding parts in the several figures.

The nature of my invention consists in hinging a rake to a ring or short sleeve used in connection with a pinion and two bevel-wheels, the pinion meshing or gearing into and between both wheels consequently turning them in contrary directions, the lower or under wheel turning on an upright spindle and having a sleeve surrounding said spindle and extending up through the upper bevel-wheel, the ring hinged to the head of the rake and also through certain saucer-shaped rims or caps, said caps having slots cut in and across their edges or a part cut away, the upper bevel-wheel has an upright rim attached to its outer and upper surface with one or more slots; also, in the employment or use of two inclined posts or springs, the above parts being arranged in such a manner that the rake will in an elevated state move toward and, if necessary, strike down in a slanting direction in under the bars of the reel (which throws the cut grain on the platform) and sweep the grain from the same, keeping in close contact therewith while so doing, after which it is raised to its original working point in an elevated position. The frequency that the rake sweeps the platform is governed in a great measure simply by changing the caps without altering the velocity of the rake.

To enable others skilled in the art to fully understand and construct my invention, I will proceed to describe it.

E represents the platform of a harvester, which may be constructed and mounted in the usual or in any proper way. On or near the corner of the platform next the driving-wheel of a harvester the raking attachment is attached by the projection S passing through the platform and retained in its position by nut Q or any suitable way.

A is the base or support of spindle V.

C is a bevel-wheel with a sleeve, D, permanently attached with a shoulder at K, and also a very shallow one or recess, as seen at O, Fig. 7. It is made very thin, with cogs on its upper side. The spindle V passes up through the wheel C and sleeve D.

H is a bevel-wheel with cogs on its lower side facing down, as in Fig. 2, and is constructed with a rim on its upper surface with slots cut in, as represented at z z, for the head of rake N to drop or rest in while sweeping the platform, as set forth in Fig. 2. The sleeve D of wheel C passes up through wheel H.

T is a projection or shoulder attached to wheel H, which rests on the shoulder K of wheel C, as seen in Fig. 7.

R is a saucer-shaped rim or cap, with one side cut away, and has a short sleeve, as seen in R, Fig. 6.

N is a rake made in the usual form, excepting having an iron head, and is hinged to a ring or short sleeve at I, as represented at L. The sleeve or ring L, attached to rake N, slips onto sleeve D of wheel C, and rests on or near the surface of bevel-wheel H, as shown in Fig. 2.

B B are saucer-shaped rims or caps with a sleeve, as seen in Fig. 4, and with slots cut at y y, as seen in Fig. 3, for the head of rake N to rest in while in an elevated state, and making its advance movement toward the reel of a harvester, as seen in Fig. 1.

U is an upright curved post or spring, and answers a twofold purpose: First, it serves to stop the rake at the proper point when in its advance toward the reel of a harvester, and prevents it advancing far enough to strike the reel; second, its upper end is curved in such a manner as to reach over the head of rake N when in an elevated position and in its forward movement, and spring said rake down or cause it to drop in one of the slots $z$ of wheel H when in its revolution one of said slots arrives at the proper point, when rake N, or the head of rake N, is at once started back in a contrary direction in close contact with the platform, and as soon as striking down on said platform the head of rake N passes in under the edge or rim of cap R or B, (said cap being attached to sleeve D of wheel C by the slots $xx$, as seen in Figs. 4 and 6, and by a screw or projection in sleeve D of wheel C at 8,) revolves in a contrary direction from wheel H, keeping rake N pressed down on the platform while sweeping or carrying the cut grain from the same, at which time cap R, or one-half of cap B, having passed over the head of rake N, it is left unconfined. At the same time rake N coming in contact with the inclined post or spring W, it is lifted or thrown out of slot $z$ in wheel H by said post or spring up to an elevated position, and resting on the edge of rim H of wheel H, or its equivalent, one-half of the time, if cap R is attached to sleeve D of wheel C—that is to say, while cap R is making the balance of its circuit around to post or spring W—when rake N is carried or pressed forward in an elevated state along the edge of rim H of wheel H by the edge of cap R coming in contact with head of rake N till rake N comes in contact with spring or post D, when it is again thrown down in slot $z$, as represented in Fig. 2; but if cap B is attached to sleeve D of wheel C at 8 the rake N, when it sweeps the platform and comes in contact or against the inclined post or spring W, is raised or thrown up into slot $yy$ of cap B, and does not remain stationary one-half of the time, as with cap R, but is at once carried forward in an elevated state, sweeping the platform twice as often as with cap R, as represented in Fig. 1.

J is a slide which is placed in one of the slots $z$ of wheel H, to fill up the same when cap R is used, which causes the rake N to pass over one of the slots $z$ in wheel H, thereby assisting rake N in sweeping the platform E, Fig. 2, only once in every revolution of wheel H; but when it is necessary to make the bundles oftener, the slide J is withdrawn, leaving both slots $zz$ of wheel or rim H open, and placing cap B on sleeve D in place of cap R, as represented in Fig. 1, thus causing rake N to sweep the platform E, Fig. 1, twice at every revolution of wheel H, or twice as often as when using cap R and slide J.

M is a pinion gearing into both wheels C and H, and can be attached to the machinery of a harvester and driven by the same in any of the known methods. The cogs of the wheels C and H are so numbered that in their revolutions the slots in the rim of wheel H and those in cap B come opposite to each other at the necessary points, so as to allow the head of rake N to be thrown from an upper slot into a lower one, or from a lower slot into an upper one, at the necessary points. The ring hinged to the head of rake N turns loose on sleeve D of wheel C, and is retained in its proper position from moving up or down by the top or surface of wheel H, and the lower end of the short sleeve of the cap B or R coming in contact, as seen in Figs. 2 and 7. There is a pin that passes through the top of the spindle V, which holds all the parts in their proper position. It will be seen that by sloping the corners of rim H of bevel-wheel H at P P the rake N can be thrown down in under the bars of a reel to any degree desired, thus allowing rake N, which can be made light, to reach well forward toward the cutter-bar of a harvester and rake the short grain to advantage as well as the long. The head of rake N, where it comes in contact with the rim of wheel H and the lower surface or edge of caps B and R, can be made round or with friction-rollers; also caps B and R can be joined together by inverting one on the top surface of the other, thus merely carrying the cap not in use on the top of the one in use. The corners of cap B are sloping, so that they will ride or slide over the head of rake N with ease when said rake is thrown down on the platform.

Having thus described my invention, what I claim as new, and desire to secure by Letters Patent, is—

1. The wheel H, constructed with an upright rim having slots, substantially as and for the purpose set forth, in combination with wheel C C, sleeve D, spindle V, caps B and R, posts or springs U and W, and rake N, all constructed and arranged substantially as set forth.

2. The caps B and R, or their mechanical equivalent, attached to the sleeve D of bevel-wheel C, turning in a contrary direction from wheel H, constructed and operating in combination with rake N, substantially as and for the purposes set forth.

3. The mechanical arrangement of rake N, with its ring or short sleeve L, with gear-wheels H and C and their attachments, whereby one wheel causes the rake to move toward the reel in an elevated state and the other in a contrary direction, causing it to sweep in close contact with the platform, substantially as set forth.

JOHN H. MEARS.

Witnesses:
E. R. COLTON,
ALBERT TUCKER.